April 7, 1970     C. J. BAKER     3,504,890
SPAR TREE ASSEMBLY WITH BASE-MOUNTED YARDING DRUMS
Filed Feb. 13, 1968
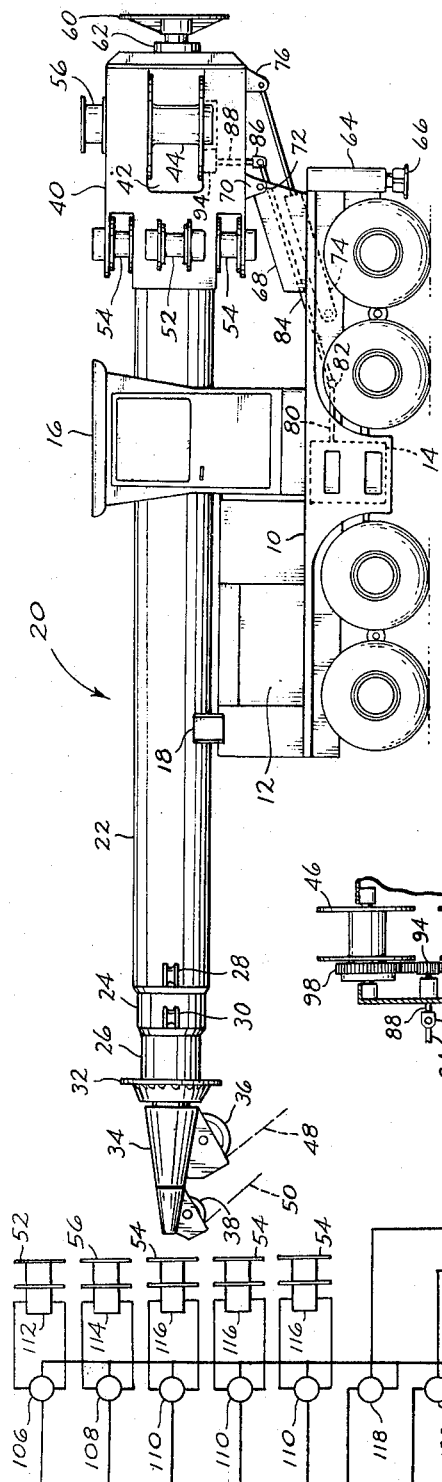
Charles J. Baker
INVENTOR United States Patent Office 3,504,890
Patented Apr. 7, 1970

3,504,890
SPAR TREE ASSEMBLY WITH BASE-MOUNTED
YARDING DRUMS
Charles J. Baker, Portland, Oreg., assignor to The
Skookum Company, Inc., Portland, Oreg., a corporation of Oregon
Filed Feb. 13, 1968, Ser. No. 705,227
Int. Cl. B66c 23/62; B66d 1/26
U.S. Cl. 254—139.1                                    4 Claims

ABSTRACT OF THE DISCLOSURE

A spar tree assembly useful in yarding logs and like applications comprises a spar pole support, a spar pole, mounting means for mounting the spar pole on the support, yarding drums, and yarding drum mounting means mounting the yarding drums on the base of the spar pole.

---

This invention relates to spar tree assemblies. It pertains particularly to mobile spar tree assemblies having a spar pole adjustable between raised and lowered positions and movable from place to place for use in yarding logs and the like in various locations.

As is well known, yarding is that operation in which logs are moved from their felled location on the forest floor to a collection point nearby where transportation to the mill is available.

For centuries animals were used for the yarding operation. Early attempts to mechanize it involved using a steam-powered ship's capstan. A cable was attached to the log and the capstan used to wind in the cable, pulling the log with it. A horse was used to pull the cable back out for the next log.

The next improvement made use of a two-drum winch. One drum was used for pulling in the logs, as with the capstan, while the other drum was used to haul the cable back out to the logging site. This was accomplished by running the cable from the haul back drum to a point beyond the waiting logs, where it was passed through a block and back to the end of the in-haul cable to which it was fastened. Thus a loop was formed, with the two ends of the cable being wound on the winch drums. When the main drum rotated, it wound the inhaul cable and pulled the log with it. When the log had reached its destination and had been released, the in-haul drum was disengaged and the haul-back drum actuated to wind in the haul-back line. This pulled the in-haul line back out to the unyarded logs.

Considerable difficulty was encountered with this system because of the tendency of the logs to hang up on stumps, rocks and other obstacles. This difficulty was greatly reduced when the two lines were raised in the air by passing them through blocks mounted on a spar tree. This gave a lift to the logs, making them easier to skid and less prone to hang up. Guy lines radiating out from the top of the spar tree to surrounding stumps were used to hold the tree steady. This basic system is known as high lead logging.

Other cable logging systems involve modifications of this basic method. For example, in the slack skyline systems a third winch drum is employed. A cable wound on that drum passes up to another sheave on the upper portion of the spar, over that sheave and thence to a stump to which it is attached. This cable serves as a skyline on which a carriage rides.

The inhaul cable is used to pull the carriage with the logs attached towards the spar and the haulback cable serves to return the carriage for more logs. Operation of the third drum makes it possible to make the skyline taut or slack, as may be desired for best operation at various times in the cycle.

In recent years, cable logging has been practiced using a mobile spar in place of the traditional spar tree. This is a tubular steel spar which can be transported about in the woods on a vehicle. It is carried in a lowered position when in transit and is raised mechanically to an elevated position when it reaches its destination. The logging winch or yarder is mounted on the same vehicle, as are separate smaller winches employed for fixing the guy lines.

Although widely employed, the application of cable logging is general, and of cable logging with mobile spars in particular, is attended by several disadvantages.

First, when a mobile spar is raised or lowered, it pivots about an axis at or near its bottom. Since the spar is long and heavy, the movement exerted about the pivot axis is very large. The weight of the fairleads running lines and guy lines add to the movement. Accordingly the size and cost of the erecting machinery is correspondingly large.

Second, when the yarding drums of the mobile spar are mounted a spaced distance away from the spar, as heretofore has been the case, the drums do not stay in the same position relative to the spar as the spar pivotally is raised and lowered. This means that slack is created in the running lines and must be taken up as the spar is lowered. Conversely the lines must be payed out, or slack provided to begin with, as the spar is raised. This is time consuming and also a potential source of damage to the equipment.

Third, lateral separation of the parding drums from the spar pole in the conventional manner prohibits yarding in a 360° arc and requires time consuming and expensive shifting of the yarding apparatus from time to time. This is for the reason that otherwise a dangerous tension condition would develop in the guy lines.

As is apparent, the tension is greatest in the guy lines opposing the pull of the main yarding line. For example, if the main line extends out to a log on the side of the spar opposite the yarding drums, the guy lines behind the latter away from the spar will be the ones which resist the pull of the main line. This "straight lead" condition imparts the minimum strain on the guy lines.

As the direction of the yarding changes from the straight lead condition the tension in the guy lines opposing the main line pull becomes greater. When the position of the main line has moved from the straight line condition, through the right angles "square lead" condition, to the "diamond lead" condition in which the main line extends from the top of the spar back over the top of the yarder, maximum tension builds up in the opposing guy lines.

In the diamond lead condition the guy lines on the side of the spar opposite the yarding drums resist the main line pull. The mainline in effect exerts a block purchase against the top of the spar and consequently the opposing guy lines and the stumps to which they are attached are subjected to greatly increased stresses. These may be sufficient to break a guy line or pull up on an anchoring stump. As a consequence, the safety codes in some states prohibit yarding at an angle much past that of the square lead. This prohibition is a distinct handicap to a logger, because, in many cases, he must stop his productive work to move the equipment around in order to reach all of the surrounding logs.

Fourth, where the yarding drums are spaced laterally from the base of the spar, a condition exists which tends to cause the yarder to "climb the main line." This results from the fact that, on a hard pull, at the same time the yarding drum is pulling down on the main line, the main line is pulling up on the yarder. The resulting main line climbing effect may actually lift one end of the supporting vehicle off the ground. This instability is very undesirable and mobile spar designers are forced to use various means to overcome it or minimize it.

Fifth, with the yarding drums located spaced apart from the spar, the heavy cables used for the main line and haul back lines are exposed. If one of them breaks the snap back can cause serious injury to the operator or anyone standing near the machine.

It is the general object of the present invention to provide a spar tree assembly which overcomes the foregoing problems and which easily is raised and lowered, which is free from a troublesome slack cable problem as the spar tree is raised and lowered, which can be used to yard logs in a full 360° arc, which is free from the problem of the yarding drums climbing the main line, and which protects the operator in case a yarding cable breaks.

The foregoing objects are achieved by the provision of a spar tree assembly which in summary comprises a mobile or stationary spar pole support, a spar pole, means for mounting the spar pole on the support, preferably pivotally, yarding drums, and yarding drum mounting means mounting the yarding drums at the base of the spar pole itself. Integrating the yarding drums with the spar pole permits placing the heavy drums at the lower end of the pole, below the pivotal means for mounting the pole on the support, thus providing a counterbalance. It eliminates the slack cable problem. It makes it impossible to create a diamond lead condition of the yarding cables, thus permitting 360° yarding. It makes it impossible for the yarding drums to climb the main line. Since, as is preferred, the yarding cables can run inside the spar pole to the fairleads at the top, a ready made shield is provided which protects the operator from injury in case a cable should break. All of these factors obviously largely enhance the efficiency of operation of the spar tree assembly and increase the degree of safety with which it may be used.

In the drawings:

FIGS. 1 and 2 are views in side elevation of the herein described spar tree illustrated in its lowered, traveling position and its raised, working position;

FIG. 3 is a view in end elevation of the spar tree assembly;

FIG. 4 is a sectional view taken along line 4—4 of FIG. 2 and illustrating the drive for the assembly; and FIG. 5 is a schematic view of a hydraulic drive for the units of an hydraulic system incorporated in the assembly.

In the illustrative embodiment of the invention shown in the drawings, the spar tree assembly is rendered mobile by mounting it on a wheeled vehicle which may be a truck, trailer, or crawler tractor but which in the form shown comprises a self-propelled, truck-type vehicle indicated generally at 10. The truck is propelled by a motor 12 which drives a transmission 14 used not only to supply the propelling drive, but also the drive for the various operating units of the assembly.

Truck 10 further is provided with an operator's cab 16 and with a spar pole support 18 which supports the spar pole its its prone position.

The spar pole, indicated generally at 20, may comprise an elongated structure variously designed and constructed. Thus it may comprise a single length of tubing, but may also comprise a plurality of tubing sections mounted in telescoping relation to achieve a pole structure of substantial height, for example, a height of 110 feet or even more. In the illustrated form of the invention the spar pole comprises three telescoping sections, 22, 24, 26, sections 22, 24 being provided with sheaves 28, 30 employed to extend the sections in known manner. Upper sections 26 of the spar pole mounts a guy line ring 32 and a double fairlead 34 which includes a main line sheave 36 and a haulback line sheave 38. All of the foregoing elements correspond essentially to corresponding elements to be found in spar tree assemblies of the prior art.

For the purposes of the present invention, however, spar pole 20 is provided with means for integrating the yarding drums with the spar pole itself, rather than mounting them as a separate structure, spaced laterally from the spar pole.

To this end, the spar pole is provided with a bifurcated base 40 having a central recess or cleft 42 in which rotatably are mounted the main line drum 44 and the haul-back line drum 46. Cables 48, 50 supplied by the drums are threaded upwardly through hollow spar pole 20 and out through fairlead sheaves 36, 38.

Base 40 also mounts a telescoping winch 52, the line from which runs through sheaves 28, 30 and a plurality of radially spaced guy line winches 54, the lines from which run through blocks attached to guy line ring 32 and are connected to stumps or other anchoring points in the usual manner. Still another winch 56 is mounted on base 40 for use in working miscellaneous rigging.

A massive pad or foot 60 is fixed across the open end of recess 42. It preferably is mounted on a base 62 of adjustable length and provides support for the spar pole when it is in its erect FIG. 2 position. In performing this function, pad 60 is assisted in a manner to be described by a pair of vertically arranged, fluid operated stabilizing cylinders 64 mounted on the back of the supporting vehicle and provided with pads or feet 66 which alternately may be withdrawn, as shown in FIG. 1, or extended into ground-engaging position, as shown in FIG. 2.

Preferably, but not necessarily, the above described spar pole structure is mounted pivotally on the spar pole support at a pivot point located intermediate the ends of the spar pole to take advantage of the counterbalancing effect of the heavy yarding drums mounted on its base.

Thus, as shown in FIGS. 1 and 2, there are provided for this purpose a pair of spaced, parallel longitudinally arranged support plates 68 fixed to the bed of truck 10. A pair of cooperating brackets 70 are fixed to one of the sides of spar pole base 40 in lapped relation to plates 68. Pivot shafts 72 are journaled in bearings suitably disposed in the lapped members to provide the desired pivotal mounting at a pivot point predetermined to afford the desired counterbalancing effect.

The necessary drive for shifting spar pole assembly from its prone traveling position of FIG. 1 to its erect, working position of FIG. 2 is furnished by means of a pair of hydraulic cylinders 74, the cases of which pivotally are connected to the mounting support and the piston rods of which pivotally are connected to brackets 76 welded to spar pole base 40.

The drive for yarding drums 44, 46 is shown particularly in FIGS. 1, 2 and 4.

Transmission 14 drives a shaft 80, the outer end of which is connected to a first universal joint 82. One end of a slip shaft 84 also is connected to universal joint 82. The other end of the slip shaft is connected to a second universal joint 86. One end of a short connecting shaft 88 is connected to universal joint 86, while the other end of the connecting shaft mounts gear 94. The teeth of the later gear mesh with the teeth of gear 95, which drives gears 96, 98 fixed, respectively, to yarding drums 44, 46. The yarding drums thus are driven in opposite directions as required to pay out on the haul back line while taking in on the main line, and vice versa.

An hydraulic drive for the remaining powered elements of the assembly is illustrated in FIG. 5.

Power transmission unit 14 drives hydraulic pump 100 which draws hydraulic fluid from reservoir 102. Fluid normally is recycled to the reservoir through pressure relief valve 104. However, the hydraulic circuit also includes valves 106, 108 and 110 which control parallel circuits including hydraulic motors 112, 114, 116 which drive respectively telescoping winch 52, rigging winch 56, and guy line winches 54. The yarding drums are controlled through the intermediate action of suitable clutching and braking elements of conventional type. The hydraulic circuit further includes valves 118, 119 which control hydraulic brake 120, and valves 122, 123, which control clutches 124, with which yarding drums 44, 46 are equipped.

Operation

The operation of the herein described spar tree assembly is as follows: the assembly is transported to its use location in the prone condition of FIG. 1. At the use location stabilizing cylinders 64 are lowered to their FIG. 2 position, elevating the bed of the truck sufficiently to afford clearance during the pivotal elevation of spar pole 20.

Tilting cylinders 74 rotate the spar pole about pivot shafts 72 until it assumes the erect position of FIG. 2. Stabilizing cylinders 64 then are retracted until support pad 60 bears substantially the entire weight of the spar pole, thereby permitting freedom of movement of the unit and preventing stresses from being transmitted from the spar pole to its carrier during its use.

The spar pole is raised using telescoping winch 52, the guy lines are set using guy line winches 54, and the yarding operation performed using yarding drums 44, 46, all in the manner indicated. The foregoing sequence then may be reversed when it is desired to take down the pole and move it to another location.

These various operations are accomplished with the significant advantages above noted. Counterbalancing the spar pole by locating yarding drums 44, 46 in its base makes it possible to raise and lower the spar pole with increased facility and safety using driving machinery of reduced size, weight and cost. It also relieves the operator from the necessity of taking up slack and paying out lines on the yarding drums as the pole is raised and lowered.

Very importantly, it enables 360° yarding, since it is impossible to attain a diamond lead condition of the mainline. Still further, it completely eliminates the tendency of the yarding drums to climb the main line and eliminates the hazard of injury to the operator caused by the snap-back of a broken cable.

It accordingly will be seen that there is provided an apparatus in which the several objects of this invention are achieved and which is well adapted for the conditions of practical use.

It is to be understood that the form of my invention herein shown and described is to be taken as a preferred example of the same and that various changes in the shape, size and arrangement of parts may be resorted to without departing from the spirit of my invention.

Having thus described my invention, I claim:

1. A spar tree assembly comprising:
    (a) a spar pole support,
    (b) a spar pole having a base end and a top end,
    (c) pivot means mounting the spar pole intermediate its ends on the support for adjusting the spar pole between raised and lowered positions,
    (d) yarding drum means,
    (e) yarding drum mounting means mounting the yarding drum means on the spar pole on the base end side of the pivot means for counterbalancing the weight of the spar pole with the weight of the yarding drum means,
    (f) rotary power means on the spar pole support, and
    (g) flexible connecting means interengaging the power means and yarding drum means for driving the latter while permitting adjustment of the spar pole between its raised and lowered positions.

2. The spar tree assembly of claim 1 wherein the base end of the spar pole is provided with a recess, and the yarding drum means comprises main line and haulback drums rotatably mounted side by side in the recess.

3. The spar tree assembly of claim 2 wherein the spar pole is hollow to form a longitudinally extending cavity, the main line and haulback lines running within the cavity.

4. The spar tree assembly of claim 1 including a plurality of radially spaced guy line drums, and mounting means rotatably mounting the guy line drums on the spar pole.

References Cited

UNITED STATES PATENTS

| | | | |
|---|---|---|---|
| 2,885,800 | 5/1959 | Hawkins | 180—53 |
| 3,033,526 | 5/1962 | Priest | 254—139.1 |
| 3,263,766 | 8/1966 | Strack | 180—53 |
| 3,269,559 | 8/1966 | Shroyer | 212—7 |
| 3,362,116 | 11/1968 | Erickson | 52—116 |

HARVEY C. HORNSBY, Primary Examiner

U.S. Cl. X.R.

52—116; 180—53; 254—185